United States Patent [19]

Reed

[11] Patent Number: 5,012,070
[45] Date of Patent: Apr. 30, 1991

[54] VEHICLE PREHEATING SYSTEM USING EXISTING VEHICLE HEATING SYSTEM

[75] Inventor: Mark E. Reed, Pierre, S. Dak.

[73] Assignee: Durkin-Reed, Inc., Pierre, S. Dak.

[21] Appl. No.: 506,817

[22] Filed: Apr. 10, 1990

Related U.S. Application Data

[63] Continuation-in-part of Ser. No. 357,213, May 25, 1989.

[51] Int. Cl.$^5$ .............................................. B60L 1/02
[52] U.S. Cl. .................................. 219/202; 219/203; 219/208; 219/279; 237/12.3 A
[58] Field of Search ............... 219/202, 203, 205, 207, 219/208, 279, 517, 370, 209; 237/12.3 A, 12.3 B, 12.3 R

[56] References Cited

U.S. PATENT DOCUMENTS

| | | | |
|---|---|---|---|
| 1,881,068 | 10/1932 | Bates | 219/202 |
| 2,527,011 | 10/1950 | Keil | 219/202 |
| 3,943,325 | 5/1976 | Pickard | 219/208 |
| 4,293,759 | 10/1981 | Higgins | 219/202 |
| 4,350,287 | 9/1982 | Richards | 219/279 |
| 4,591,691 | 5/1986 | Badali | 219/202 |

*Primary Examiner*—Bruce A. Reynolds
*Assistant Examiner*—Tu Hoang
*Attorney, Agent, or Firm*—Richard C. Litman

[57] ABSTRACT

A vehicle preheating system which provides for the preheating of the vehicle interior, as well as other components, is disclosed. The system includes an electrical heating element installed within the water lines of the vehicle and is supplied with electrical power by an external source. The unit containing the electrical heating element may also include a valve which can shut off coolant flow to and from the engine block, thus warming the vehicle interior more quickly. Alternatively, the electrical heating element may be used to preheat the engine as well as the interior as desired, or additional electrical heating elements may be installed in other areas. The standard vehicle heater fan is supplied with electrical power from a transformer and rectifier in the circuit, thus using only external power rather than vehicle battery power. The system is controlled by a timer controller, which may be preset to activate the heater assembly at some predetermined time prior to vehicle operation, and may provide for other component preheating devices such as engine and battery warmers. The timer controller may activate each of these devices simultaneously, or independently at various times depending upon the lead time required to thoroughly warm each component. Alternatively, power may be applied to each device in turn in order to avoid excessive current draw from the external circuit. The external power cord is contained on a reel which is installed within the vehicle body and is retracted onto the reel for storage when not in use.

12 Claims, 3 Drawing Sheets

VEHICLE PREHEATING SYSTEM USING EXISTING VEHICLE HEATING SYSTEM

CROSS-REFERENCE TO RELATED APPLICATION

The present application is a continuation-in-part of application Ser. No. 07/357,213, filed May 25, 1989.

FIELD OF THE INVENTION

This invention relates generally to preheating and warming devices to be used in motor vehicles in cold climates, and more specifically to a preheating system incorporating several elements including an interior preheating element powered by an external power source.

BACKGROUND OF THE INVENTION

It has long been realized that as a general rule, the efficiency of mechanical devices decreases rapidly with the onset of colder temperatures. This is particularly true with motor vehicles. As temperatures decrease, lubricants tend to increase in viscosity, thereby requiring greater energy on the part of the vehicle starting system to "turn over" a cold engine. At the same time, it is more difficult for fuel to vaporize, thereby also hindering the starting process. Yet, under the very conditions requiring maximum output from the vehicle electrical system, the typical electrochemical vehicle storage battery has also lost efficiency due to the temperature decrease.

Even assuming that all the systems of the vehicle are in optimum operating condition, there will still be a great deal of increased wear and tear of the systems subjected to startup in such cold conditions. Due to the thickening of lubricants, more time is needed for the oil pump to force such lubricants to critical areas, and at the same time the excess fuel required to provide for sufficient vaporization tends to wash down or dilute what lubricants may remain in such critical areas from the previous time the vehicle was run. Typically, the vehicle battery is more deeply discharged during cold weather starting, which tends to shorten the life of such a battery even if the vehicle charging system is operating optimally.

While various devices have been developed to overcome one or more of the conditions noted above, each of these devices typically addresses only a single component of the system. Moreover, while many such devices are known which are capable of preheating critical mechanical or electrical components, the question of the vehicle interior has been largely neglected. Although some vehicle interior preheating devices are known, they generally fall short of providing for all of the preheating needs of modern vehicles. Not only is the preheating of the vehicle interior helpful in maintaining the pliability of many of the materials used in modern vehicle interiors and thus preventing their cracking or deterioration due to the brittleness caused by cold conditions, but warming the vehicle interior can be helpful from the standpoint of driver comfort and therefore safety, as the driver will be able to attend to driving the vehicle more efficiently when not distracted by the discomfort of cold conditions until the vehicle interior reaches comfortable temperatures as the engine warms to normal operating temperatures during operation.

Although devices are known which perform many or most of the above functions, in order to make use of such devices to preheat the vehicles it is necessary in may cases to activate the devices some two hours or more prior to starting the vehicle due to the relatively low power output of the devices and the resulting time required to warm the related components thoroughly. For the typical motorist, this requires either activating the devices before retiring for the night, which results in the usage of electrically energy for the entire night, or rising an hour or more earlier than otherwise in order to activate the devices sufficiently early to allow the thorough warming of components before starting the vehicle. While various timers are known, the use of such a device would add yet another component for the operator to handle each time he desired to preheat the vehicle. Moreover, assuming that the vehicle required some few preheating devices, it is possible that their simultaneous use could overload the circuit from which they were drawing their energy.

What is needed is a vehicle preheating system providing for the preheating of not only various essential mechanical components of the vehicle, but also for the warming of the vehicle interior. Such a system must be capable of being preset to allow actuation without the presence of the vehicle operator or other persons, and adjustable to provide for the alternate actuation of the various heating components of the system in order to allow the system to draw power from a single circuit without overloading that circuit. All of the devices should be wholly contained within the vehicle, with no requirement for the operator to remove or install equipment prior to operating the vehicle, and all equipment should be capable of preheating the vehicle without the need to draw power from the battery of the vehicle.

A further feature to include in a vehicle preheating system is the ability to utilize the present interior heating apparatus of the automobile that was installed at the factory. These heating systems are usually hot water systems that run from the engine block to the fan in the outlet section and back again. It would ease the installation of a preheating system if it was possible to use this original hot water circulation system. Using the hot water circulation system removes the necessity of having to modify the outlet section of the interior heater. Only the easily accessible water lines would be affected.

DESCRIPTION OF THE RELATED ART

As noted above, vehicle preheating devices of various types are well known. Bates U.S. Pat. No. 1,881,068 discloses a vehicle interior preheating system using an electric heating element installed in the coolant tank of the vehicle heater. While such a device may serve the intended purpose, the necessity of electrical lines passing through the heater shell serves to lessen the reliability of the overall system by providing for the possiblity of leaks, and further adds an additional element to which to transfer the heat, i.e., from heating element to coolant and thence to the air, rather than a more direct transfer. Bates patent also discloses the use of the device to preheat the engine by means of the heated coolant flow from vehicle heater to engine, but while such a system would likely provide sufficient warmth for the engine, it is unlikely that it could also provide sufficient energy to warm the vehicle interior to a comfortable degree simultaneously, particularly when ambient temperatures are at zero degrees Fahrenheit or below.

Kiel U.S. Pat. No. 2,527,011 discloses an engine preheating device which operates by warming the coolant and allowing it to flow through the engine due to thermal siphon effect. While the present invention allows for the inclusion of a device serving the same purpose, the device of the Kiel patent is limited in function compared to the overall utility of the present invention.

Carroll U.S. Pat. No. 2,537,330 discloses a vehicle interior heater intended for use in automobiles parked at outdoor theaters. As such, the devices must be capable of being quickly and easily installed and removed from vehicles, generally by merely placing the device within the vehicle or suspending it from the edge of a vehicle window, or replacing it on a storage rack. Thus, the device would not stay with the vehicle as it was driven to various locations.

Higgins U.S. Pat. No. 4,293,759 discloses a car preheater that utilizes a heater mounted in the trunk of an automobile to heat the interior of a car from a remote location. Household power is utilized to heat the car so that the battery does not drain. This device does not provide for heating the additional elements of the automobile which are necessary for an easy start up.

None of the above listed patents are seen to disclose the specific arrangement of concepts disclosed by the present invention.

SUMMARY OF THE INVENTION

By the present invention, an improved system for preheating or warming a vehicle interior and other system components is provided.

Accordingly, one of the objects of the present invention is to provide a vehicle preheating system incorporating an electrical resistance heating element installed within the lines of the original water circulation system which runs into a standard vehicle heater fan housing and is thereby capable of warming the interior of the vehicle.

Another of the objects of the present invention is to provide a vehicle preheating system capable of warming the interior of the vehicle which utilizes most of the existing vehicle interior heater components, including the fan and water circulation coils, and also incorporates other electrical devices to provide power for such a fan without drawing power from the storage battery of the vehicle.

Still another of the objects of the present invention is to provide a vehicle preheating system incorporating not only an interior preheating device and subsystem, but also devices providing for the preheating of other vehicle components.

Yet another of the objects of the present invention is to provide a vehicle preheating system capable of using standard household electrical current, and thereby not discharging the vehicle storage battery.

A further object of the present invention is to provide a vehicle preheating system which incorporates a timer in order to provide for the remote activation and operation of the system.

An additional object of the present invention is to provide a vehicle preheating system incorporating a timer which is capable of activating each of the components of the system simultaneously, or alternatively activating each of the components of the system consecutively or in some other prearranged or automated order.

A further object of the present invention to provide a vehicle preheating system which utilizes a programmable remote control unit to set the timer in activating the various components of the system.

Another object of the present invention is to provide a vehicle preheating system which incorporates a retracting mechanism for the electrical power cord, thereby providing convenient storage for the cord and insuring that all required components of the system remain with the vehicle.

Still another object of the present invention is to provide a vehicle preheating system which incorporates a warning which will alert the vehicle operator when the power cord is providing power and the vehicle ignition is turned on. Alternatively, the system may be constructed in such a way that the vehicle starting system is disabled when the power cord is providing power.

Yet another object of the present invention is to provide a vehicle preheating system capable of selectively operating the windshield and/or window defroster systems of the vehicle for those vehicles in which such systems are electronically operated.

With these and other objects in view which will more readily appear as the nature of the invention is better understood, the invention consists in the novel construction, combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
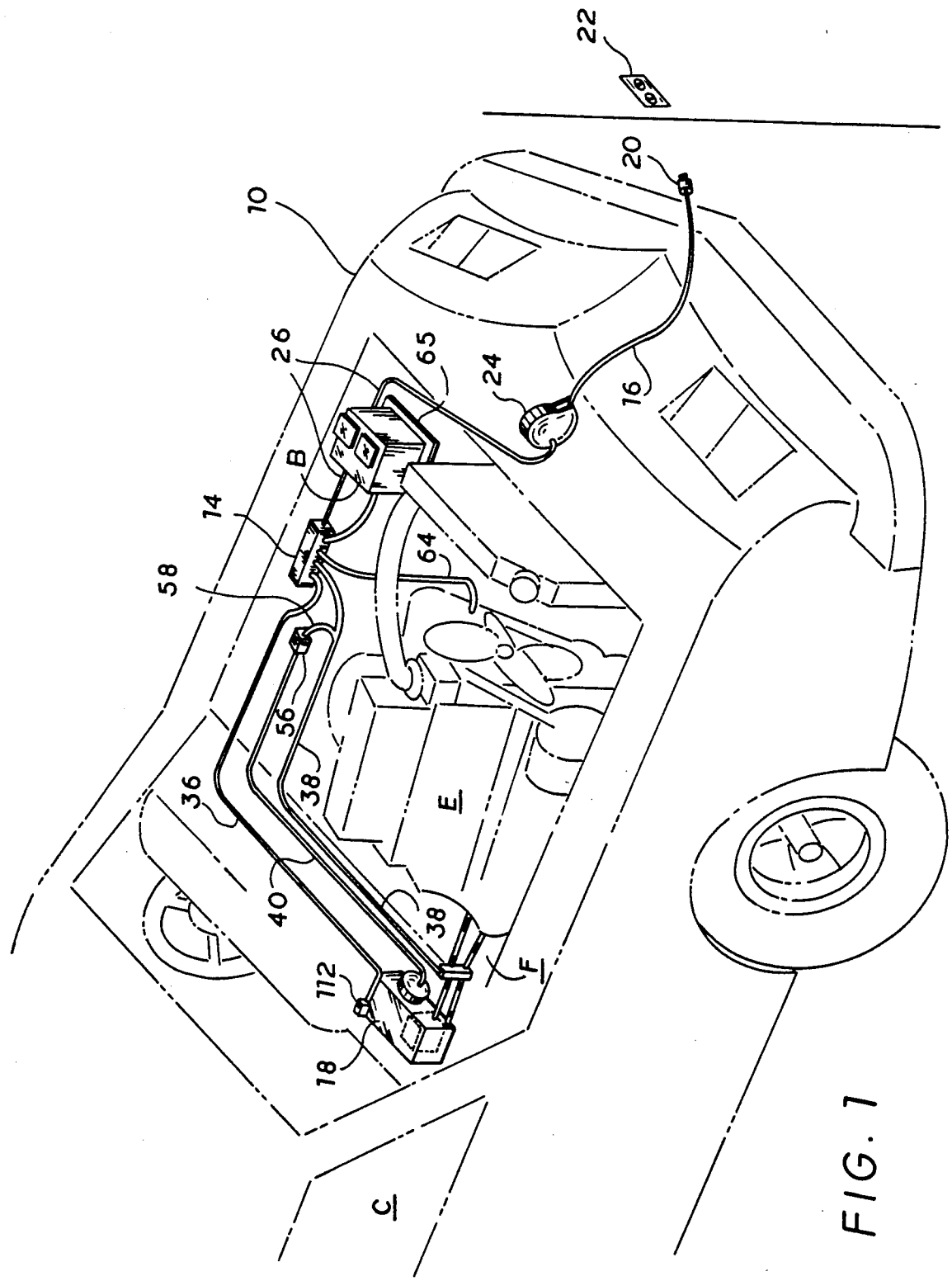
FIG. 1 is a perspective view, partially broken, of a typical motor vehicle, showing the arrangement and relationship of the various components of the system as installed in such a vehicle.

Referring now to the drawings, particularly FIG. 1, the present invention will be seen to relate to a system for the preheating or warming of vehicle interiors and/or mechanical components prior to vehicle operation in cold conditions. The system is completely contained within vehicle 10 and includes a timer control 12, terminal block 14, power cord 16, vehicle interior heater assembly 18, and other components described further below.

Power cord 16 supplies standard household electrical current to the system and includes a standard male plug 20 which may be inserted into any convenient standard outlet 22 in order to supply power to the system. Power cord 16 is contained on a retractable cord reel 24, similar to those used with so called "drop lights" and similar devices well known. Reel 24 may be installed in any convenient location on or within vehicle 10, but preferably is installed as closely as possible to the engine of the vehicle 10 and other components requiring heat in order to provide the shortest run possible for other electrical cables and cords and thereby cause the minimum voltage drop possible. Reel 24 may be installed behind the grille, under a fender well, or under the hood of such a vehicle 10, thereby concealing the cord 16 when it is retracted on the reel 24 and not in use.

Figure 2:
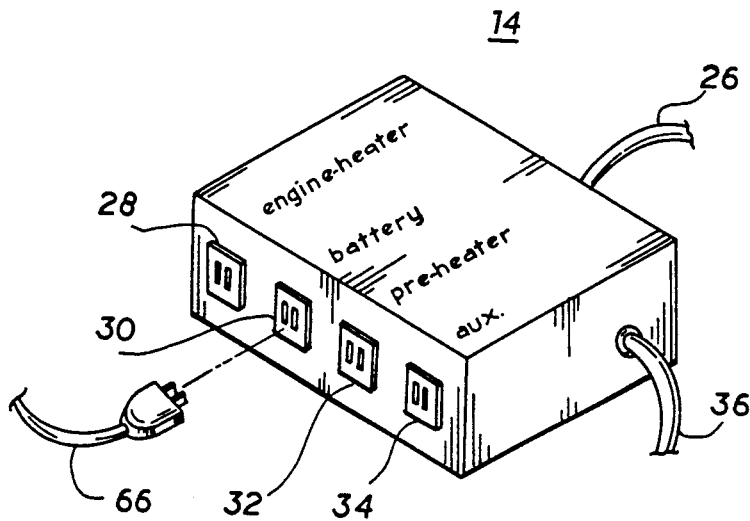
FIG. 2 is a perspective view of the terminal block used in the system, providing for the electrical connection of the various components of the system.

Terminal block supply cable 26 is installed within the vehicle and supplies power from cord reel 24 to the terminal block 14. Terminal block 14 is more clearly shown in FIG. 2, and may be seen to provide an engine heating element outlet 28, battery warmer outlet 30, water line preheater outlet 32, and an auxiliary outlet 34 to supply electrical power to a plurality of heating devices. Terminal block 14 also contains other components, not shown, to further control electrical power output to one or more of the outlets 28 through 34, as further described below.

Figure 3:
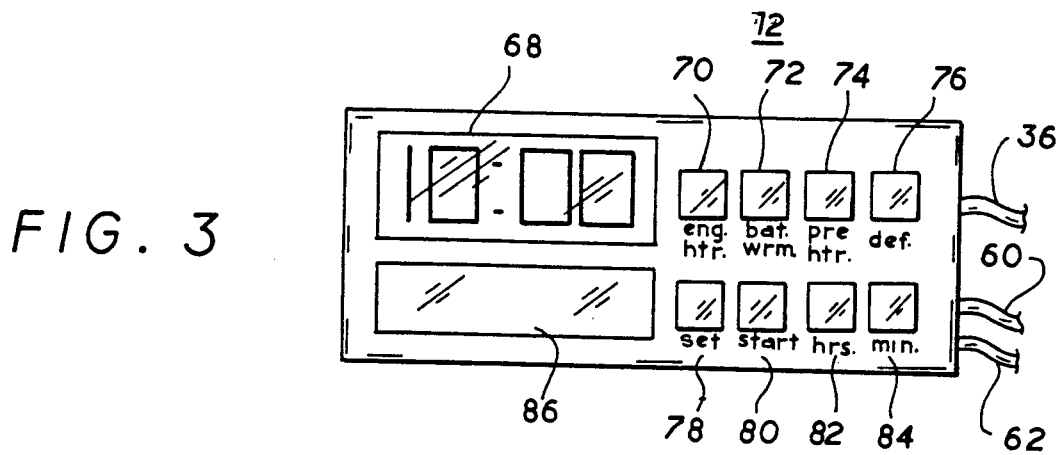
FIG. 3 is a front view of the timer control and warning system.

Control of electrical power to outlets 28 through 34 of terminal block 14 is provided by timer control 12, shown best in FIG. 3. Timer control 12 may be installed at any convenient location within the vehicle 10, but is preferably installed within the passenger compartment C, such as on or beneath the dash or instrument panel of the vehicle 10 in order to be most easily accessible to the operator of vehicle 10. Timer control 12 is connected to and receives power from terminal block 14 by means of control cable 36, and also sends signals back to terminal block 14 to operate a relay or relays, not shown, within terminal block 14 to control power to one or more of the outlets 28 through 34, according to the instructions entered into timer control 12 by the operator.

Figure 4:
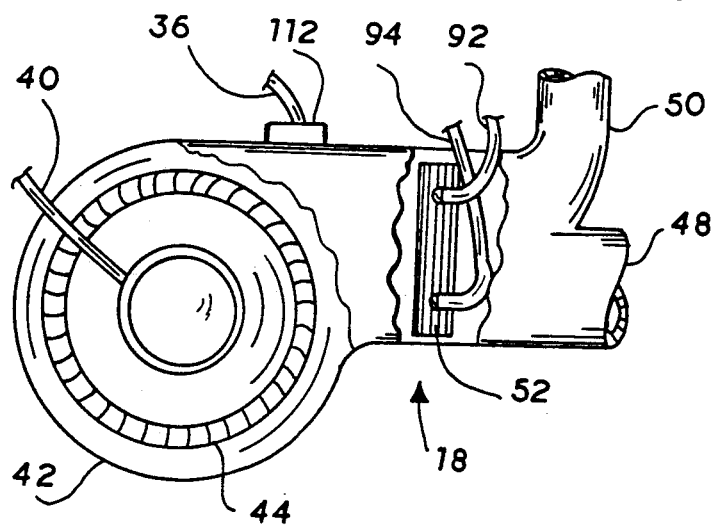
FIG. 4 is a side view, partially in section, of a typical vehicle heater fan and housing assembly, showing the installation of the water lines.
Figure 5:
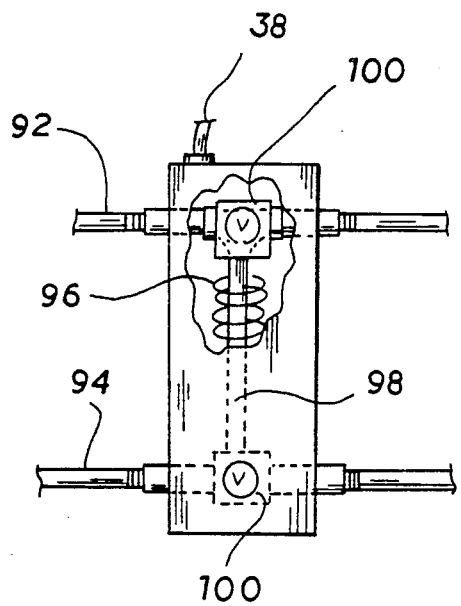
FIG. 5 is side view of the electrical heating element which is used to supply heat to the water circulation system of the automobile.

The interior or passenger compartment C of vehicle 10 is warmed by the existing heater assembly 18. Fan motor supply cable 40 powers the fan motor 46 and is controlled by timer control 12 when the preheat system is operating, as with other components of the system. Heater assembly 18 is more clearly shown in FIG. 4. Typically, such heater systems comprise a housing 42, fan 44, fan motor 46, and contain one or more coils 52 which are fed by water lines 92 and 94. Water line 92 feeds into heating coil 52 from a separate heating element 96. Water line 94 feeds out from the heating coil 52 and returns back to the electric heating coil 96. Electric heating coil 96 surrounds water line section 98 and heats up the water contained therein for delivery to the heating coil 52 through water line 92. By allowing heater element cable 38 to be of a size typical of that supplied with most electric heaters, electric heater element 96 may supply sufficient heat to comfortably warm the interior of the typical vehicle 10 with reserve. The interior temperature of vehicle 10 may be controlled by a thermostat which senses the temperature of the delivered air at the output side of heater element 52 and controls the current flow to electric heater element 96 accordingly.

Water lines 92 and 94 normally flow to and from the engine block when the engine is normally running and the heater 18 is turned on. Valves 100 allow for rerouting the water flow when the engine is not running and it is desired to preheat the interior of the automobile. When valves 100 are used to close the pathway to the engine block off, water travels through section 98 and thereby through electric heating element 96. Electric heating element 96 is powered by household current from power line 38. These valves 100 can be arranged so that any engagement of current through electric heating element 96 will automatically close off water lines 92 and 94 from the engine block and shunt water through section 98 to be heated and sent through heating coil 52. Water lines 92, 94 would be sent through a conventional water pump (not shown).

As noted above, heater assembly 18 includes all of the standard components normally installed in a typical vehicle 10, including fan motor 46. As fan motor 46 is normally powered by the electrical system of vehicle 10, a transformer-rectifier 56 is provided in the preheating system in order to supply fan motor 46 with the proper electrical current. Rectifier 56 receives electrical power from terminal block 14 by means of transformer-rectifier power cable 58 or a branch of heater element supply cord 38, and supplies direct current of the proper voltage to fan motor 46 by means of fan motor supply cable 40.

In many cases a vehicle 10 may be parked outdoors and receive a coating of frost, ice or snow between periods of operation. Thus, it may be desirable to have most of the heat provided by heater assembly 18 delivered to the defroster outlets 50 rather than the heater outlets 48 of the vehicle 10. In many such vehicles the valves controlling the flow of heated air between heater and defroster outlets 48 and 50 are electrically controlled. Such electrically controlled valves may be actuated by timer control 12 by means of an interface cable 60 between a point in the electrical system of vehicle 10, such as the ignition control system, and timer control 12, thence to any electronic heater-defroster valve controls within vehicle 10 by means of heater-defroster control cable 62. Such controls draw relatively little electrical power, particularly once set, and thus would not discharge the battery of any vehicle 10 to any appreciable degree. The system could also be wired so that various components could draw their power from the battery of vehicle 10, preferably only for short term usage. Such an alternative wiring system is not shown in the drawings, as the system disclosed in the drawings is the preferable embodiment. Alternatively, vehicle electrical system power may be supplied to timer control 12 by means of another line, not shown, from transformer-rectifier 56 to timer control 12, avoiding any usage of electrical power from the battery of vehicle 10. Such power from transformer-rectifier 12 may also be used to provide for the heating of other devices, not shown, such as rear window defrosters and/or electrically heated seats.

Terminal block 14 also provides for the installation of other vehicle component preheating devices by means of outlets 28, 30 and 34 not used by interior electrical water heater element 96 by means of cable 38 and transformer-rectifier cable 58, if used. Typically, an engine heating unit, not shown, would also be installed in the system, and would receive power from an outlet 28 of terminal block 14 by means of engine heater supply cable 64. Such an engine heater may be of several forms, such as a dipstick heating element, engine oil pan heating pad or blanket, or radiator or heater hose type heating element. The present invention is intended to provide for the use of any such heating element as may be desired to be used in combination with the engine E and other system components as located on either side of the vehicle firewall F. In addition, a warming device for the battery B, such as the illustrated pad 65 or the like, may also be connected to terminal block 14 by means of battery warmer cable 66.

Timer control 12, most clearly shown in FIG. 3, may include a clock 68, heater element function controls 70 through 84, and a warning indicator 86 to indicate that the power cord 16 should be unplugged and retracted before operating the vehicle 10. Clock 68 may be used as a standard digital clock, and programmed and set by means of set key 78, hour and minute keys 82 and 84 respectively, and start key 80. Preheating functions for the various devices installed in vehicle 10 may be programmed in a similar manner by including engine heater key 70, battery warmer key 72, interior preheater key 74, and/or defroster key 76 in the programming. Thus, if the vehicle operator wishes to depart at 6:30 am, for example, timer control 12 could be programmed to activate one or more of the above functions at perhaps 4:30 or 5:30 am, depending upon the ambient temperature and the wishes of the operator. Some heating elements may take less time to bring the component or area which they are heating up to the desired temperature than other elements. Timer control 12 makes provision for such events by allowing different heating elements to be activated at different times.

Figure 6:
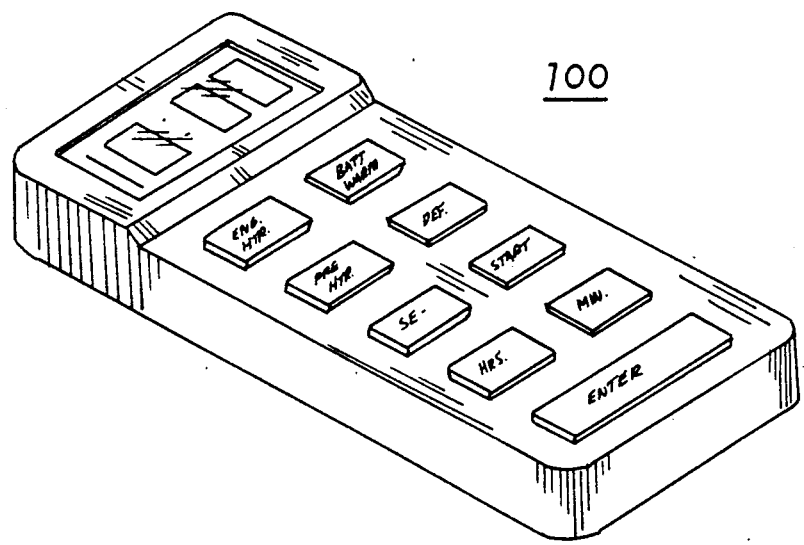
FIG. 6 is a perspective view of the programmable remote control which allows for programming the system from a remote location.

A remote control programmer unit 110 shown in, FIG. 6, may be used to preset the operation of the whole system from a remote location, such as inside the car owner's house on a cold winter day. The remote unit 110 includes the same command settings; engine heater, battery warmer, preheater, start, hours, set, etc., that the timer control 12 has. The remote receiver unit 112 receives commands from the remote unit 110 and sends them to the timer control 12. Remote receiver is an integral part of the timer control unit 12.

In some cases it may be found that all of the heating elements operating in combination will draw more current than the supply circuit will allow. If such is the case, provision may be made for cycling the various heating devices by means of the timer control 12 and control relays contained within terminal block 14 so that one or more devices are inoperative at any given time. In this way the total current draw at any given time will be lessened to an acceptable level for the circuit providing power.

When the vehicle operator is ready to depart, the only requirement is that he or she unplug and retract power cord 16 from outlet 22. At this point the vehicle interior C and critical components will be warmed to desirable operating levels, thus saving wear and tear on components, saving fuel, and increasing driver comfort and safety.

Should it occur that the operator not remember to disconnect power cord 16 from outlet 22, notification may be provided by means of a simple series circuit which will cause warning notice 86 on timer control 12 to flash and/or an aural warning to sound when timer control 12 is receiving power from both control cable 36 by way of terminal block 14 and power cord 16, and from the vehicle 10 ignition system by way of interface cable 60. Alternatively, power received by timer control 12 from control cable 36 may be used to activate a relay, not shown, connected to the ignition system by way of interface cable 60, thus disabling the starter system when power cord 16 is plugged in and the preheater system is drawing power.

It is to be understood that the present invention is not limited to the sole embodiment described above, but encompasses any and all embodiments within the scope of the following claims.

I claim:

1. In a vehicle having a body defining an engine compartment separated from a passenger compartment by a firewall, a liquid cooled internal combustion engine in the engine compartment, a storage battery forming a component of the vehicle electrical system, a heater assembly having a core adapted to receive heated liquid from the engine through water conduit passageways and including electrically driven fan means powered by the vehicle electrical system for discharging heated air from the heater core into the passenger compartment, the improvement comprising;

said heater assembly including a housing having at least one outlet for said discharging of heated air, said fan means when operated defining an air flow path directing air from said heater housing through said outlet, an electrical resistance heating unit disposed externally of said heater assembly housing and disposed adjacent said water conduit passageways, said heating unit operable to generate heat upon the application of electrical current, valve means disposed in said conduit passageways to reroute said liquid from said engine to said electrical resistance heating unit, an electrical connection on said vehicle adapted to be supplied with alternating current from an external source, electrical circuits between said electrical connection and said heater assembly, said circuits including a first circuit joined to said electrical resistance heating unit and a second circuit joined to said fan means, said electrical circuits including means to utilize said supplied electrical current through said second circuit to operate said fan means and through said first circuit to operate said heating unit, whereby externally supplied alternating current is capable of operating both said electrical resistance heater unit and said fan means to preheat the confines of the vehicle passenger compartment.

2. The vehicle heater assembly of claim 1 including;

means to transform and rectify said supplied alternating current to direct current of the proper voltage and deliver said direct current through said second circuit to operate said fan means and through said first circuit to operate said heating unit, whereby an operator may employ externally supplied alternating current to operate both said electrical resistance heater unit and said fan means with a portion of the same source of alternating current being transformed and rectified to operate the existing heater assembly fan means.

3. The vehicle heater assembly of claim 1 wherein;

said heater assembly contains a thermostat, said thermostat communicating with said first circuit, thereby controlling current from said first circuit to said electrical resistance heater unit.

4. The vehicle heater assembly of claim 1 including;

a supply cord carried by said vehicle and adapted to be connected with said externally supplied alternating current to said first circuit, said supply cord mounted upon a reel, said reel internally installed within said vehicle, and said reel providing means for retracting and storing said supply cord when said supply cord is not in use.

5. The vehicle heater assembly of claim 1 wherein, said first circuit includes a terminal block, said terminal block containing a plurality of electrical outlets, whereby said electrical outlets provide electrical current for a plurality of vehicle component preheating devices.

6. The vehicle heater assembly of claim 5 wherein; said vehicle component preheating devices include an engine preheating device.

7. The vehicle heater assembly of claim 5 wherein; said vehicle component preheating devices include a battery warming device.

8. The vehicle heater assembly of claim 5 wherein; said first circuit includes a timer control, said timer control communicating with said terminal block, whereby said timer control is capable of being preset to remotely activate and/or deactivate one or more of said electrical outlets independently of each other.

9. The vehicle heater assembly of claim 8 wherein; said timer control communicates with said vehicle electrical system, and said timer control includes circuitry providing warning if said vehicle electrical system is activated by said operator and said first circuit is receiving said externally supplied alternating current.

10. The vehicle heater assembly of claim 9 wherein; said timer control warning includes flashing light means.

11. The vehicle heater assembly of claim 9 wherein; said timer control warning includes aural means.

12. The vehicle heater assembly of claim 8 including:

a remote control unit for communicating with said timer control.

* * * * *